Jan. 26, 1954       H. AMATEL       2,667,267
PACKAGE OF FRAGILE ARTICLES
Filed May 17, 1949                                        2 Sheets-Sheet 1
Fig. 1.
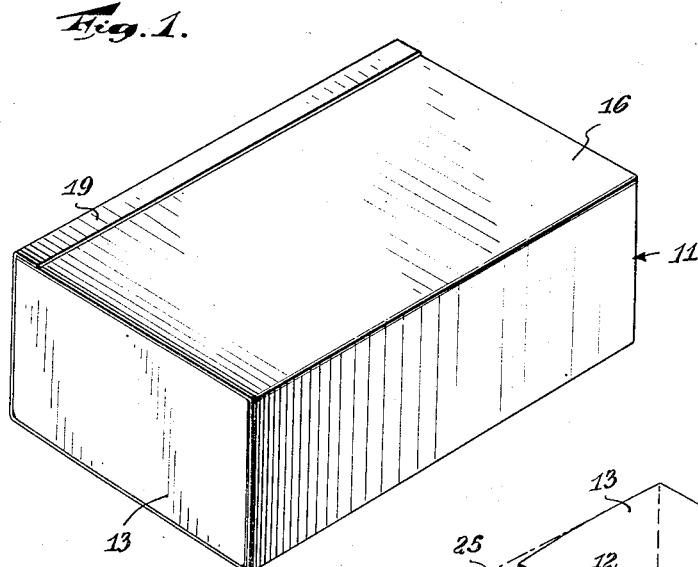
Fig. 2.
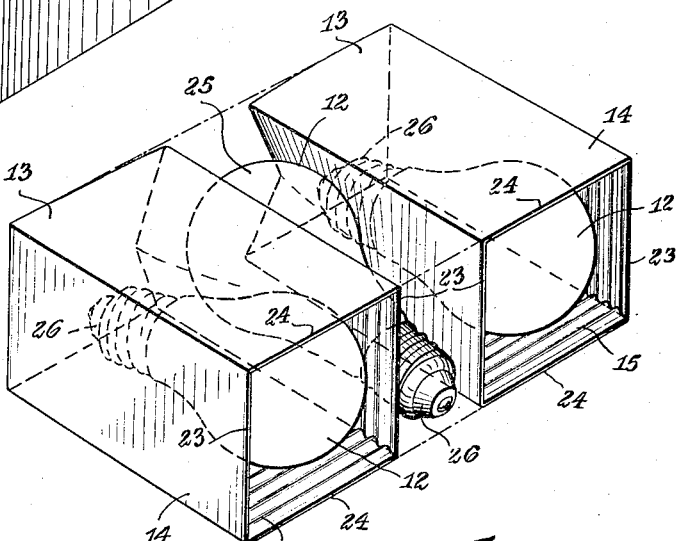
Fig. 3.
Fig. 4.
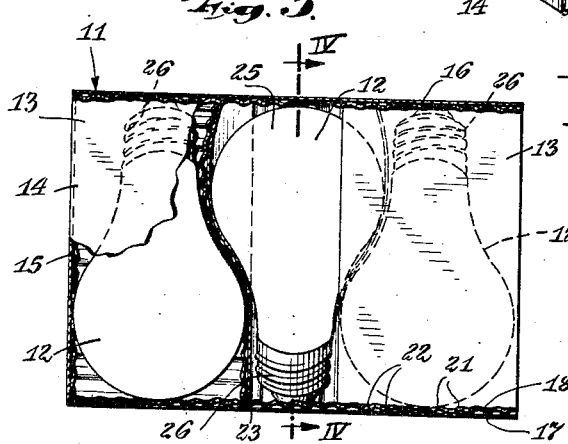
INVENTOR
HAROLD AMATEL
BY
ATTORNEY Jan. 26, 1954 H. AMATEL 2,667,267
PACKAGE OF FRAGILE ARTICLES
Filed May 17, 1949 2 Sheets-Sheet 2
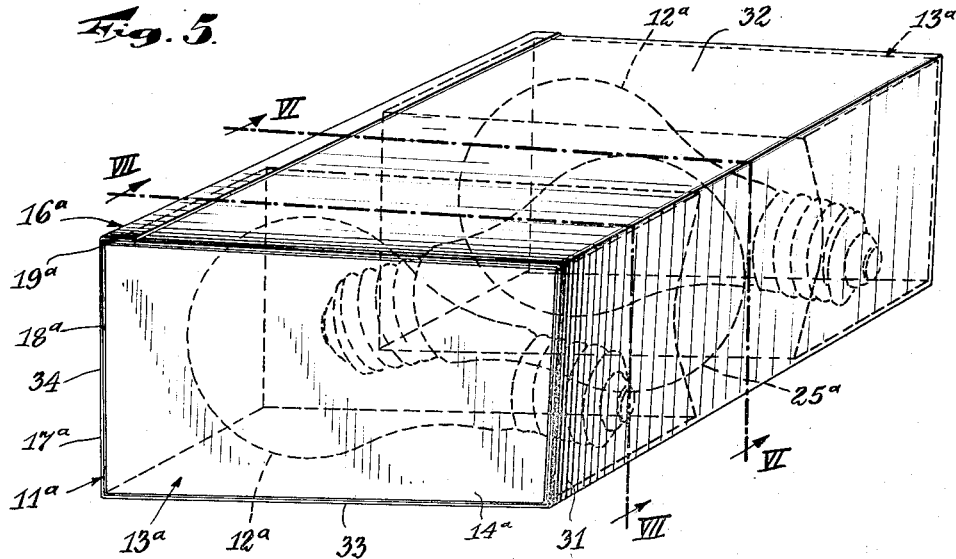
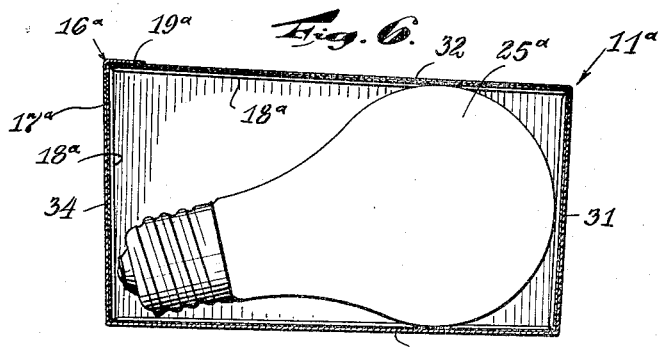
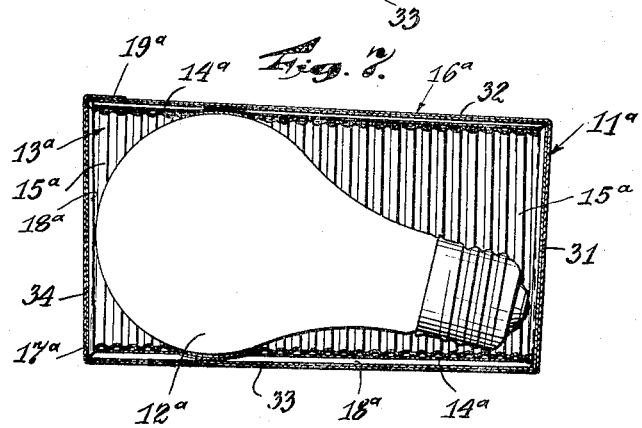
WITNESS:
Towson Price
INVENTOR
HAROLD AMATEL.
BY
ATTORNEY

Patented Jan. 26, 1954

2,667,267

UNITED STATES PATENT OFFICE 2,667,267

PACKAGE OF FRAGILE ARTICLES

Harold Amatei, Glendale, N. Y., assignor to Westinghouse Electric Corporation, East Pittsburgh, Pa., a corporation of Pennsylvania Application May 17, 1949, Serial No. 93,754

1 Claim. (Cl. 206—65)

This application is a continuation-in-part of my abandoned application Ser. No. 18,987, filed April 5, 1948, and similarly entitled.

This invention relates to a method of packing, and container for, fragile articles, and more particularly to such for holding three incandescent electric lamps.

The principal object of my invention, generally considered, is to provide a container for a convenient number of, such as three, fragile articles or incandescent electric lamps, wrapping material being saved by omitting the wrapper for the intermediate or middle lamp, space and material being further saved by arranging in a row and alternating the lamps base up and base down in each package, and the dimensions of the container being desirably modified to provide for sufficient frictional grip on the intermediate lamp to prevent it unintentionally falling out when one of the end lamps is removed.

Another object of my invention is to provide a container for three fragile articles comprising an outer four-sided, open-ended paper casing, having a corrugated interior wall, and two four-sided, open-ended paper wrappers proportioned to each hold one article and completely occupy an end space within said casing, portions of the edges of said wrappers when in place being depressed to conform with said corrugated wall, and other portions of said edges being disposed in trough portions of said wall, the length of said outer casing being such that when the outer walls of said wrappers are respectively flush with the opposite outer edges of said casing, the inner walls of said wrappers are spaced for the snug reception of an unwrapped article therebetween.

A further object of my invention is to provide a casing, for one unwrapped and two wrapped articles, formed of single-faced corrugated paper, with the unwrapped lamp between the wrapped lamps and alternating base up and base down.

A still further object of my invention is to provide a method of packing fragile articles, such as incandescent electric lamps, comprising placing a wrapped lamp in one end of an outer corrugated paper casing, placing an unwrapped lamp in said outer casing against the inner wrapper of said wrapped lamp, in reverse position as compared with said wrapped lamp, and closing said outer container with another wrapped lamp, positioned to be reversed as compared with the unwrapped lamp, the proportions of the lamp wrappers being such, as compared with the length of the outer casing, that when completely packed, the large end or bowl of said unwrapped lamp indents the wrappers of the wrapped lamps at their base ends for space economy.

Other objects and advantages of the invention will become apparent as the description proceeds:

In the drawing,

Figure 1 is an isometric view of a container for three lamps.

Figure 2 is a view corresponding with Figure 1, but showing the lamps when the outer casing has been removed.

Figure 3 is a longitudinal sectional view of the packed container, showing a portion of one of the inner wrappers broken away, and taken on the line III—III of Figure 4 in the direction of the arrows.

Figure 4 is a transverse sectional view on the line IV—IV of Figure 3, in the direction of the arrows.

Figure 5 is an isometric view corresponding to Figure 1, but showing lamps in place in a modified form of container.

Figure 6 is a transverse sectional view on the line VI—VI of Figure 5, in the direction of the arrows.

Figure 7 is a transverse sectional view on the line VII—VII of Figure 5, in the direction of the arrows.

Referring to the drawing in detail, like parts being designated by like reference characters, and first considering the embodiment of my invention illustrated in Figures 1 to 4, inclusive, there is shown a container 11 for three fragile articles, which in this instance happen to be, as illustrated, incandescent electric lamps 12. Two of said lamps are each received in a sleeve or wrapper 13 of the usual commercial type, consisting of an outer, preferably 40 pound, paper sheet 14 and an inner, preferably 40 pound, corrugated paper sheet 15. The corrugations of each wrapper desirably extend transverse to the wrapper axis, as illustrated. In the present embodiment the lamps are arranged in groups of three, fitted within a four-sided, open-ended paper casing 16, formed as an outer paper sheet 17, and a corrugated interior wall sheet or lining 18. The interior wall sheet 18 may be formed of paper such as ordinarily used for such containers, that is, it may correspond with the corrugated paper which is engaged by the bulb of a lamp 12.

The duplex material for the four-sided, open-ended casing 16, formed as illustrated, is desirably held together by a strip or flap 19 which may be an extension of the outer paper sheet 17 and glued to the other end of the material, as illustrated. The corrugations of the casing lining 18 are desirably so arranged that the summits 21 and troughs 22 therebetween extended transversely to the longitudinal axis of the casing, whereby the latter is provided with a corrugated inner wall in best condition to hold the wrapped articles.

The wrappers 13 of the incandescent electric lamps are so proportioned that the length from one edge at an open end to the corresponding edge at the opposite open end is substantially equal to the distance between troughs of the corrugations at opposite sides of the casing 16. The edges 23 of the wrappers, by reason of their flexibility, move over the corrugations of the inner wall of the casing and lie in planes substantially coincidental with planes in which lie the troughs of the corrugations of the casing, and will thus be held in position against accidental displacement. The other edges 24 of the wrappers, being resilient, will frictionally engage the corrugated wall 18 to aid in holding the wrappers in place.

The outer casing 16 is loaded, in accordance with my invention, by placing a wrapped article or lamp in one end portion thereof, placing an unwrapped article or lamp therein and in engagement with the adjacent inner wall of the wrapper of the placed lamp, as indicated at 25, and completing the package by placing the other wrapped lamp in the other end portion of said casing 16.

From a consideration of Figures 2 and 3, it will be seen that the proportioning of the parts is such that when the outer wrapped lamps are in place, with their outer walls flush with the outer edges of the outer container 16, their inner walls are deflected by the spherical or bulb portion of the lamp, designated 25, which is positioned in the opposite manner, as compared with the wrapped lamps, that is, the base 26 faces or points in a direction opposite to that of the bases of said wrapped lamps, thereby effecting a close nesting of the lamps with respect to one another and a saving in space as well as wrapping material.

As an indication of the material and space that may be saved by employing the container and method of packing in accordance with the present embodiment, let us consider the dimensions of the wrappers and outer container for packing three standard 60 watt, 120 volt, incandescent electric lamps. The lamp wrappers 14 for such lamps may be about 4⅜" long and each have a periphery of about 9¼". The outer container in which such lamps are received, in accordance with my invention is shaped to snugly receive the wrapped lamps, as indicated, and has a periphery of about 13¾" and a length of about 6½", rather than 7¼" for three wrapped lamps. This means that, by omitting the inner wrapper for the intermediate lamp, about ¾" is saved in length of the outer wrapper, as well as one complete inner wrapper. Thus, about 50.6 square inches, or about 23% of single faced corrugated paper are saved in each package, as compared with a similar package in which the intermediate lamp also has a wrapper. At the same time, it has been found that this omission of the inner wrapper does not run the risk of damage to the contained lamps under normal handling conditions, the indenting of the end wrappers by the center lamp preventing rattling of the latter.

Referring now to the embodiment of my invention illustrated in Figures 5, 6, and 7, there is shown a container 11ᵃ for three fragile articles which, as in the preceding embodiment, happen to be incandescent electric lamps. Two of said lamps designated 12ᵃ are each received in a sleeve or wrapper 13ᵃ of the usual commercial type, consisting of an outer preferably 40 lb. flat paper sheet 14ᵃ, and an inner preferably 40 lb. corrugated paper sheet 15ᵃ. The corrugations of each wrapper, as in the preceding embodiment, desirably extend transverse to the wrapper axis. Said lamps are also arranged in groups of three, that is, two wrapped lamps 12ᵃ and an unwrapped lamp 25ᵃ therebetween, fitted within a four-sided, open-ended paper casing 16ᵃ. The latter is formed as an outer flat paper sheet 17ᵃ and a corrugated interior wall sheet of lining 18ᵃ. The outer and interior wall sheets 17ᵃ and 18ᵃ, may, as in the preceding embodiment, be formed of paper customarily used for such containers, as in the preceding embodiment.

The duplex material for the four-sided, open-ended casing 16ᵃ, is as in the preceding embodiment desirably held together by a strip of flap 19ᵃ. This flap may be an extension of the outer paper sheet 17ᵃ and glued to the other end of the material, as illustrated. The corrugations of the casing lining 18ᵃ are desirably so arranged that their summits and troughs therebetween extend transversely to the longitudinal axis of the casing, as in the preceding embodiment and for a similar purpose.

The wrappers 13ᵃ of the lamps 12ᵃ are so proportioned that the length from one edge at an open end to the corresponding edge at the opposite end is substantially equal to the distance between troughs of the corrugations at opposite sides of the casing 16ᵃ. The edges of the wrappers 13ᵃ, which are shown vertical in the drawing, by reason of their flexibility, move over the corrugations of the inner wall of the casing and lie in planes substantially coincident with the planes in which lie the troughs of the corrugations of the casing, and will thus be held in position against accidental displacement. The other edges of said wrappers, will frictionally engage said corrugated wall 18ᵃ to aid in holding the wrappers in place.

The improvement in the present embodiment, compared with that of the first embodiment, involves rearranging the dimensions of the wrapper or casing 16ᵃ, to effect a taper for the purpose of holding the central lamp 25ᵃ with a firmer grip than heretofore to thereby prevent the possibility of its accidental dislodgement from said casing upon the removal of one of the end lamps 12ᵃ. In other words, one side wall 31 of the casing 16ᵃ is decreased in width a small amount, and that decrease added to an adjacent wall, in this case the top wall 32, thereby making said wall 32 and in this case, as illustrated in Figure 5, the bottom wall 33, converge toward one another from left to right, while the widths of the side wall 34, and that of said bottom wall 33 are left unchanged.

The outer casing 16ᵃ is loaded, in accordance with my invention, by placing a wrapped article of lamp 12ᵃ in one end portion thereof, so that its large end or bowl lies in the wider, or as illustrated, the left hand portion of the container 16ᵃ, placing an unwrapped article or lamp therein and in engagement with the adjacent wall of the wrapper of the placed lamp 12ᵃ, as indicated at 25ᵃ, with its bowl or large end extending in the opposite direction, that is, lying in the narrower or right hand portion of the container 16ᵃ, and completing the package by placing the other wrapped lamp in the other end portion of said casing 16ª with its bowl or large end portion extending in the same direction as that of the other wrapped lamp and, therefore, lying in the wider or left hand portion of said container.

From a consideration of Figure 5, it will be seen that the proportioning of the parts is such that when the outer wrapped lamps are in place with their outer walls flush with the outer edges of the outer container 16ª, their inner walls are deflected by the spherical or bulb portion of the lamp designated 25ª, thereby effecting a close nesting of the lamps with respect to one another and a saving of space as well as material.

As an indication of the material and space that may be saved by employing the container and method of packing in accordance with the present embodiment, let us consider the dimensions of the wrappers and outer container for packing three standard 60 watt, 120 volt, incandescent electric lamps. The wrappers 14ª for such lamps may be about 4⅜" long and each have a periphery of about 9¼". The outer container in which said lamps are received, in accordance with the present embodiment, is shaped by adjusting the normal dimensions which are 2½" on the short sides and 4⅜" on the long sides, so that one short side, in this instance the right hand side 31 as viewed in Figure 5, is 2⅜" wide, and the other short side 34, 2½" wide. The bottom, or that designated 33, is 4⅜" wide, and the top, or that designated 32 in Figure 5, is 4½" wide, thereby producing a slight converging taper of the container toward the right.

This means that not only are the wrapped lamps 12ª snugly received with their bowl ends in the wider portion of the container 16ª, but the unwrapped lamp 25ª has its bowl end firmly gripped, and with a greater than normal force, in the narrower portion of the outer container 16ª, thereby insuring that said middle lamp is not dropped out unintentionally, even if one of the end lamps is removed and at the same time employing no more material for the wrapper.

Thus, the outer container in which the lamps are received, in accordance with this embodiment, has a periphery of about 13¾" like the wrapper in the preceding embodiment, while the other dimensions and the amount of saving as compared with the first embodiment are unchanged. At the same time, it has been found that this change in dimensions and the omission of the inner wrapper does not run the risk of damage to the contained lamps under normal handling conditions. The indenting of the inner wrappers by the center lamp, in addition to the firm gripping of its bowl due to tapering, prevents rattling. In packing such tapered wrappers, it is of course desirable to alternate them so that the wide portion of one wrapper lies on top of the narrow portion of the next wrapper, although this is not especially important in view of the only slight change in dimensions as compared with the normal or conventional wrapper.

The elimination of the wrapper on the center or intermediate lamp, besides saving paper due to the fact that no wrapper is used on the lamp, and the package is shorter providing a more convenient carry-home package, has the following sales advantage. If a customer wants one lamp, he will be presented with the intermediate or unwrapped lamp, with the suggestion that he take the three-lamp package. Upon reaching home, if he followed the suggestion, he will presumably place the unwrapped lamp in the empty socket he desired to fill, and keep the two wrapped lamps safely stored for future use.

Although a preferred embodiment of my invention has been disclosed, it will be understood that modifications may be made within the spirit and scope of the appended claim.

I claim:

A package of three like incandescent electric lamps comprising an outer four-sided, open-ended paper casing having a corrugated interior wall, two four-sided open-ended paper wrappers also having corrugated interior walls, each containing an incandescent electric lamp and completely occupying an end space within said casing, the open ends of said wrappers being closed by side walls of said casing, the bases of said lamps pointing transverse to said casing and in the same direction, a bare lamp snugly disposed in said outer casing between said wrapped lamps, with its bowl end portion deflecting the wrappers thereof and its base pointing in a direction opposite to that of the bases of said wrapped lamps, the sides of said casing converging laterally from a normal wrapper-holding spacing toward the bowl end of said bare lamp and gripping the same, as well as compressing the base-containing portions of the wrappers on either side.

HAROLD AMATEL.

References Cited in the file of this patent

UNITED STATES PATENTS

| Number | Name | Date |
| --- | --- | --- |
| 622,023 | Schmidt | Mar. 28, 1899 |
| 690,185 | Rike | Dec. 31, 1901 |
| 1,212,793 | March | Jan. 16, 1917 |
| 1,313,337 | Schinscholl | Aug. 19, 1919 |
| 1,723,021 | Fagan | Aug. 6, 1929 |
| 1,840,053 | Prince | Jan. 5, 1932 |
| 1,899,207 | Munson | Feb. 28, 1933 |
| 1,905,027 | Amatel | Apr. 25, 1933 |
| 2,097,757 | Deike | Nov. 2, 1937 |
| 2,197,510 | Ringler | Apr. 16, 1940 |
| 2,358,664 | Shailer | Sept. 19, 1944 |
| 2,593,689 | Mitchell | Apr. 22, 1952 |